United States Patent
Salomaa et al.

(10) Patent No.: US 7,242,508 B2
(45) Date of Patent: Jul. 10, 2007

(54) INFRARED MODULATOR FOR SPECTROMETER

(75) Inventors: Ilkka Salomaa, Lieto (FI); Petri Jaakkola, Vantaa (FI); Osmo Turunen, Helsinki (FI)

(73) Assignee: Gasmet Technologies Oy, Helsinki (FI)

( * ) Notice: Subject to any disclaimer, the term of this patent is extended or adjusted under 35 U.S.C. 154(b) by 175 days.

(21) Appl. No.: 10/542,156

(22) PCT Filed: Feb. 11, 2004

(86) PCT No.: PCT/FI2004/000064

§ 371 (c)(1),
(2), (4) Date: Jul. 12, 2005

(87) PCT Pub. No.: WO2004/072595

PCT Pub. Date: Aug. 26, 2004

(65) Prior Publication Data

US 2006/0050281 A1 Mar. 9, 2006

(30) Foreign Application Priority Data

Feb. 12, 2003 (FI) .................................. 20030214

(51) Int. Cl.
*G02F 1/03* (2006.01)

(52) U.S. Cl. ...................................... 359/245; 359/238

(58) Field of Classification Search ................ 359/245, 359/238, 239, 259, 261, 263, 267
See application file for complete search history.

(56) References Cited

U.S. PATENT DOCUMENTS

| 4,881,814 | A | 11/1989 | Hoult |
| 5,459,572 | A | 10/1995 | Rasanen et al. |
| 6,141,101 | A | 10/2000 | Bleier et al. |
| 6,504,613 | B1 | 1/2003 | Akikuni et al. |
| 2006/0278830 | A1* | 12/2006 | Nishizawa et al. ...... 250/341.1 |

* cited by examiner

*Primary Examiner*—Timothy Thompson
(74) *Attorney, Agent, or Firm*—Merchant & Gould P.C.

(57) ABSTRACT

The invention relates to an infrared modulator for spectrometer. It comprises a light source (1), a beam splitter (2) for splitting the light from the source into two beams, a first plane mirror (4) for directing the light of the first beam, a second plane mirror (5) for directing the light of the second beam, a first cube corner mirror (7) for turning the light back to the first plane mirror (4), and a second cube corner mirror (6) for turning the light back to the second plane mirror (5). The first and second cube corner mirrors (6, 7) are arranged on a common optic axis to reflect into opposite directions and movable back and forth in the direction of said optic axis. According to the invention, the beam splitter (3) and the first and second plane mirrors (4, 5) are supported by the same support structure formed by one uniform material piece.

5 Claims, 1 Drawing Sheet

INFRARED MODULATOR FOR SPECTROMETER

BACKGROUND OF THE INVENTION

The invention relates to an infrared modulator for spectrometer, which comprises a light source, a beam splitter for splitting the light from the source into two beams, a first plane mirror for directing the light of the first beam, a second plane mirror for directing the light of the second beam, a first cube corner mirror formed of three mirrors perpendicular to each other for turning the light directed by the first plane mirror back to the first plane mirror, and a second cube corner mirror formed of three mirrors perpendicular to each other for turning the light directed by the second plane mirror back to the second plane mirror, the first and second cube corner mirrors being arranged on a common optic axis to reflect into opposite directions and movable back and forth in the direction of said optic axis. The mirror system formed by the cube corner mirrors is a double cube corner whose task is to return the light directed to it exactly to its incoming direction to the above-mentioned first and second mirrors and through them to the beam splitter in which the light beams interfere with each other.

The invention is intended for use especially in a Fourier transformation spectrometer of the infrared or near-infrared regions to modulate radiation into a format that allows the calculation of the spectral distribution of the radiation to be measured by using Fourier transformation.

When the path lengths of the two light beams are exactly the same, an interference maximum of all wavelengths is detected in the output of the device. When moving the double cube corner in the direction of the light beams coming from the first and second mirrors, the wavelength distribution of the light passing through the device can be measured utilizing the interferences of different wavelengths.

In Fourier transformation infrared (FTIR) spectroscopy, many kinds of devices are used in modulating infrared radiation, the simplest being the Michelson interferometer based on the use of plane mirrors. In spectroscopic applications, it is very important that the movement of the mirror generating modulation does not cause changes in the alignment of the beams. This problem has been solved for instance by using what is known as the dynamic alignment system, in which the alignment of the mirror of one of the beams of the interferometer is changed continuously so as to maintain the modulation unchanged. Attempts have also been made to change the movement of the mirrors such that it does not cause changes in modulation. This has been attempted for instance by using a rotational movement instead of a linear movement.

The problems of alignment caused by plane mirrors have also been solved by replacing the plane mirrors with cube corner mirrors in the Michelson interferometer, but these have not been able to achieve a sufficiently stable structure for field conditions. The double-beam interferometers described in U.S. Pat. Nos. 4,165,183 and 4,319,843 are also based on the use of cube corner mirrors, but neither of them is designed for Fourier transformation spectroscopic applications and, thus, their solutions for the moving mechanism, for instance, do not serve the purpose of the present case.

A focusing interferometer, as known for instance from U.S. Pat. No. 5,459,572, has nearly achieved the desired field usability, but the solution has, in practice, proven sensitive to vibration, because the spherical mirrors used as end mirrors are unavoidably massive and, thus, susceptible to mechanical disturbance.

SUMMARY OF THE INVENTION

An object of the present invention is to act as an instrument modulating the radiation of a low-resolution Fourier transformation spectrometer that is suited for use in problematic conditions: in varying temperatures and vibration. This is achieved by the structure of the invention that is characterized in that the beam splitter and the first and second plane mirrors are supported by the same support structure formed by one uniform material piece.

The support structure supporting the beam splitter and the first and second plane mirrors is most preferably only fastened to its mounting platform in one limited area of the support structure.

The best operation is achieved by a symmetrical support structure in which the beam splitter is on the symmetry axis and the first plane mirror and the second plane mirror are symmetrically on different sides of the beam splitter equidistant from it and the area where the support structure is fastened to the mounting platform is at the beam splitter. It is also advantageous to make the support structure of a homogenous and massive material, such as brass.

According to the basic idea of the invention, the desired end-result, i.e. a structure enduring varying temperatures and vibration, is achieved by taking into consideration two important factors: symmetry and a compact structure.

A symmetric structure is achieved by placing the locations of the first and second mirrors after the beam splitter symmetrically equidistant from the beam splitter. When the mirror locations are also on the same piece with the beam splitter, separate from the rest of the equipment, it is possible to ensure that temperature changes cannot affect the different branches of the beam in different manners, for instance through the mounting platform. Because the path length difference is fourfold in comparison with the physical movement of a moving cube corner system, even a small movement achieves sufficient resolution. The structure of the modulator can be made extremely compact. Further, the optic can be implemented so that the beam splitter and the mirrors returning the beam, in this case a double cube corner system, are in immediate proximity to each other, whereby the device becomes very stable.

BRIEF DESCRIPTION OF THE DRAWINGS

The invention will now be described in greater detail by means of preferred embodiments and with reference to the attached drawings, in which.

DETAILED DESCRIPTION OF THE INVENTION

Figure 1:
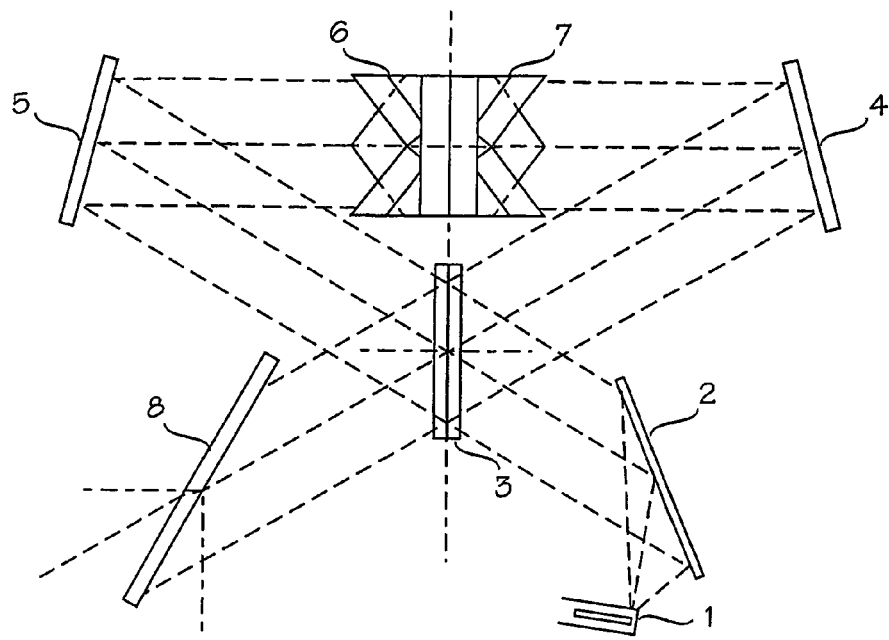
FIG. 1 is a schematic view of the operation of an infrared modulator of the invention.

FIG. 1 of the attached drawing is a schematic view of the general operation of an infrared modulator of the invention. In FIG. 1, reference number 1 is used for a light source that directs light through a plane mirror 2 to a beam splitter 3.

The beam splitter splits the light from the mirror 2 into two beams, of which one passes directly through the beam splitter and the other reflects from the beam splitter. The beam of light passing directly through the beam splitter is received by a plane mirror 5 and the beam of light reflecting from the beam splitter is received by a plane mirror 4. The plane mirror 4 directs the light to a cube corner mirror 7 formed by three mirrors perpendicular to each other, which is arranged to turn the light back exactly to its incoming direction. In the same way, the light reflected by the plane mirror 5 is turned back exactly to its direction of travel by means of a second cube corner mirror 6 formed by three mirrors perpendicular to each other.

The cube corner mirrors 6 and 7 are arranged as close to each other as possible on a common optic axis to reflect in the opposite directions. The cube corner mirrors 6 and 7 thus form a double cube corner whose task is to return the incoming light exactly into its incoming direction, i.e. back to the mirrors 4 and 5 and through them to the beam splitter 3, where the light beams interfere with each other. With the plane mirrors 4 and 5 equidistant from the beam splitter 3 and the cube corner mirrors equidistant from the plane mirrors 4 and 5, the path lengths of the light beams are exactly the same, and an interference maximum of all wavelengths is detected in the output of the device. This output is obtained from a plane mirror 8 that receives the light from the beam splitter and directs the light beam outside the infrared modulator. When the double cube corner is moved along its optic axis, i.e. back and forth in the direction of the light beams incoming from the plane mirrors 4 and 5, the wavelength distribution of the light passing through the device can be measured utilizing the interferences of different wavelengths. The system of FIG. 1 thus forms a modulator that can be used in a spectrometer. Such a modulator can modulate the radiation to be measured into a format, from which the spectral distribution of the radiation can be calculated by means of Fourier transformation.

In accordance with the present invention, an infrared modulator is provided, which is less sensitive than before to temperature changes and vibration. The most important reason for this is the structure, by means of which the components of the infrared modulator are connected to each other. Specifically, it is the support structure, which binds the beam splitter 3 and the plane mirrors 4 and 5 together and is according to the invention implemented as a uniform material piece and made of a homogeneous and massive material, such as brass.

Figure 2:
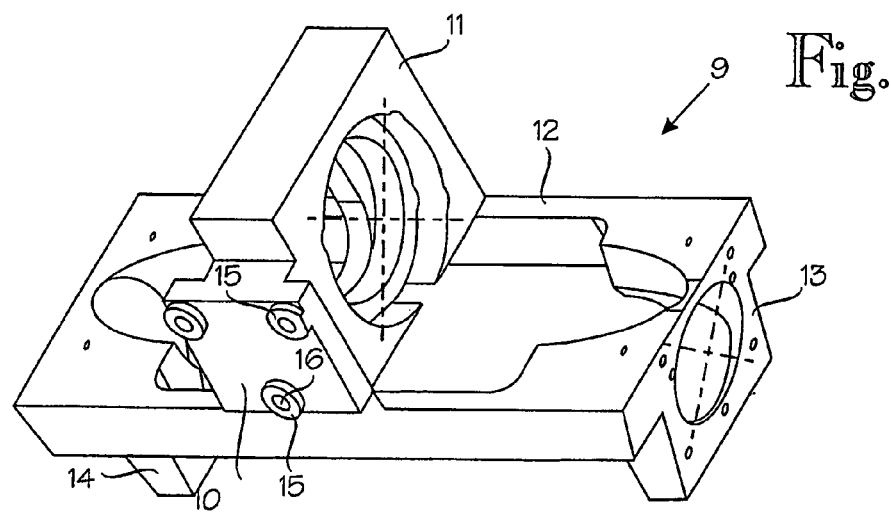
FIG. 2 is a perspective view of a preferred embodiment of a support structure of mirrors used in an infrared modulator of the invention.

A preferred embodiment of the support structure of the invention is shown in perspective in FIG. 2. In FIG. 2, the support structure 9 that connects the beam splitter 3 and the plane mirrors 4 and 5 firmly together is shown slanted from below so that the area where it is fastened to the mounting platform is visible and marked with reference number 10. The part of the support structure located above the mounting platform and generally in the shape of parallelepipeds and marked with reference number 11 is intended for fastening the beam splitter 3. The beam splitter 3 is fastened to an opening in the part 11 in a known conventional manner such that it can be positioned exactly.

Figure 3:
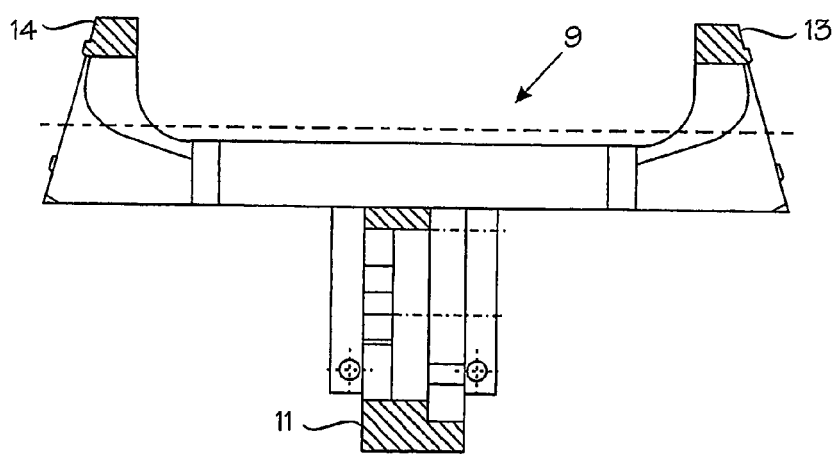
FIG. 3 is a cross-section of the support structure of FIG. 2.

The support structure 9 forms, when viewed from above, a T-shaped piece, in which the foot of the T is, however, relatively short and formed of the above-mentioned part 11, which is for fastening the beam splitter 3. This shape of the support structure is best seen in FIG. 3. On the crossbeam of the T, marked with reference number 12 in FIG. 2, there are branches 13 and 14 substantially parallel with the part 11 and extending away from ends of the beam 12. These branches 13 and 14 are intended for fastening the plane mirrors 4 and 5. These branches 13 and 14 have openings, to which the plane mirrors 4 and 5 are fastened by conventional means enabling their exact positioning. So as to allow light beams to travel unhindered from the beam splitter 3 to the plane mirrors 4 and 5 fastened to the openings of the branches 13 and 14, the part 12 of the support structure 9 is shaped in the manner shown in FIG. 2 such that the generally slab-shaped piece formed by the part 12 is open in the middle.

As shown in FIG. 1, the double cube corner system formed by the cube corner mirrors 6 and 7 is intended for placement between the plane mirrors 4 and 5. FIGS. 2 and 3 also show that this is possible in practice. The opening in the piece 12 and placing the plane mirrors 4 and 5 on the branches 13 and 14 make it possible to place the double cube corner between the plane mirrors 4 and 5 such that it can be moved back and forth without hindrance from the support structure 9.

As shown in FIGS. 2 and 3, the support structure combining the beam splitter 3 and the plane mirrors 4 and 5 is made of one uniform material piece. To obtain the best possible vibration resistance, the material of the support structure 9 is homogeneous and massive, such as brass. The support structure 9 binds the beam splitter 3 and the mirrors 4 and 5 to each other such that they cannot under any circumstance move relative to each other. The support structure 9 is also symmetrical such that the beam splitter 3 is on its symmetry axis and the mirrors 4 and 5 are symmetrically on different sides of the beam splitter 3 equidistant from it.

A very essential factor in the infrared modulator of the invention is also that the support structure is fastened to its mounting platform, such as modulator frame or casing, in only one limited area. This area is marked with reference number 10 in FIG. 2. It is on the symmetry axis of the support structure below the beam splitter 3. As shown in FIG. 2, the area 10 is equipped with three support pins 15 having central drillings 16 with inner threads. Thus, the support structure 9 can be fastened to the mounting platform by inserting three screws through it that penetrate the drillings 16 of the support pins 15 and fasten the support structure 9 to the platform. This way, the support structure is only supported at one point that is symmetrically located with respect to the support structure. This type of support method is advantageous in view of both the thermal expansion and vibration resistance of the support structure 9. When using this type of support method, a possible thermal expansion of the support structure 9 in connection with temperature changes affects evenly the entire structure and the symmetrical dimensions of the support structure 9 remain unchanged.

Since this invention does not concern the moving mechanism of the double cube corner system 6, 7, it is not described in more detail. However, the following examines the requirements set for this moving system and its possible implementation methods based on the prior art.

Moving the double cube corner system 6, 7 that returns beams requires that the movement remain exactly on the optic axis of the mirrors and especially that the positions of the corners of both halves of the mirror system remain exactly the same with respect to the optic axis. In field conditions susceptible to vibration and temperature changes, this is a difficult requirement, since the device should also be compact. Thus, the busbar-controlled belt-driven moving mechanism according to U.S. Pat. No. 4,165,183 is not suitable, since it is mainly intended for laboratory conditions, but a substantially better solution is disclosed in U.S.

Pat. No. 5,457,531. In it, the mechanism that moves the mirror system returning beams is a pendulum-type mechanism having at least two flexible arms, with which the movement of the mirror system returning beams can be made linear in the desired movement range. The moving mechanism known from said publication is incorporated herein by reference.

The infrared modulator of the invention is above described by means of only one exemplary embodiment. It is obvious to a person skilled in the art that the basic idea of the invention can be implemented in many different ways. The invention and its embodiments are thus not restricted to the example described above, but can vary within the scope of the claims.

The invention claimed is:

1. An infrared modulator for spectrometer, comprising
   a light source;
   a beam splitter for splitting the light from the source into two beams;
   a first plane mirror for directing the light of the first beam;
   a second plane mirror for directing the light of the second beam,
   a first cube corner mirror formed of three mirrors perpendicular to each other for turning the light directed by the first plane mirror back to the first plane mirror;
   a second cube corner mirror formed of three mirrors perpendicular to each other for turning the light directed by the second plane mirror back to the second plane mirror, the first and second cube corner mirrors being arranged on a common optic axis to reflect into opposite directions and movable back and forth in the direction of said optic axis; and
   a support structure formed by one uniform material piece for supporting the beam splitter and the first and second plane mirrors.

2. An infrared modulator as claimed in claim 1, wherein the support structure is symmetrical such that the beam splitter is on its symmetry axis and the first and second plane mirrors are symmetrically on different sides of the beam splitter equidistant from it.

3. An infrared modulator as claimed in claim 1, wherein the support structure is provided with only in one limited area for fastening the support structure to a mounting platform.

4. An infrared modulator as claimed in claim 3, wherein said one limited area for fastening the support structure to a mounting platform is at the beam splitter.

5. An infrared modulator as claimed in claim 1, wherein the support structure is made of a homogenous and massive material, such as brass.

* * * * *